United States Patent
Grant et al.

(10) Patent No.: US 6,181,042 B1
(45) Date of Patent: Jan. 30, 2001

(54) METHOD FOR PREVENTING CORONA SURFACE DAMAGE IN END WINDINGS OF AIR-COOLED MOTORS AND GENERATORS

(75) Inventors: James Jonathan Grant, Niskayuna; Mark Markovitz, Schenectady, both of NY (US)

(73) Assignee: General Electric Co., Schenectady, NY (US)

( * ) Notice: Under 35 U.S.C. 154(b), the term of this patent shall be extended for 0 days.

(21) Appl. No.: 09/087,721

(22) Filed: May 30, 1998

(51) Int. Cl.[7] .................................................... H02K 1/00
(52) U.S. Cl. ...................... 310/179; 310/260; 310/270; 310/271; 310/196; 310/45; 29/596
(58) Field of Search .................................. 310/179, 260, 310/270, 271, 196, 45; 525/123, 126, 127, 131; 428/324, 414; 524/100, 102; 252/408, 316; 29/596

(56) References Cited

U.S. PATENT DOCUMENTS

| | | | |
|---|---|---|---|
| 3,824,683 | 7/1974 | Rhudy | 29/596 |
| 4,020,017 | 4/1977 | Smith et al. | 528/361 |
| 4,273,674 | 6/1981 | Ligon, Jr. et al. | 436/7 |
| 4,298,656 | 11/1981 | Mendelsohn | 428/414 |
| 4,344,006 | 8/1982 | Mendelsohn | 310/43 |
| 4,367,425 | 1/1983 | Mendelsohn et al. | 310/260 |
| 4,427,740 | 1/1984 | Stackhouse et al. | 428/324 |
| 5,753,729 | 5/1998 | Valet et al. | 524/100 |
| 5,817,821 | 10/1999 | Valet et al. | 546/188 |

FOREIGN PATENT DOCUMENTS

| | | |
|---|---|---|
| 992219 | 5/1965 | (GB). |
| 1342426 | 1/1970 | (GB). |
| 1240701 | 7/1971 | (GB). |
| 1306061 | 2/1973 | (GB). |

*Primary Examiner*—Thomas M. Dougherty
*Assistant Examiner*—Thanh Lam
(74) *Attorney, Agent, or Firm*—Hartman & Hartman

(57) ABSTRACT

An end winding (10) of a high voltage air-cooled ac generator or motor is made more resistant to surface deterioration by corona activity by using a paint whose binder contains at least 20% by weight silicone. An end winding, including its insulated conductors and separator and support structures, are coated with the paint whose composition includes a solvent or thinner, optional pigments, and the binder containing at least 20% by weight silicone. The balance (if any) of the binder can be, for example, an alkyd, acrylic, phenolic or epoxy resin.

20 Claims, 1 Drawing Sheet

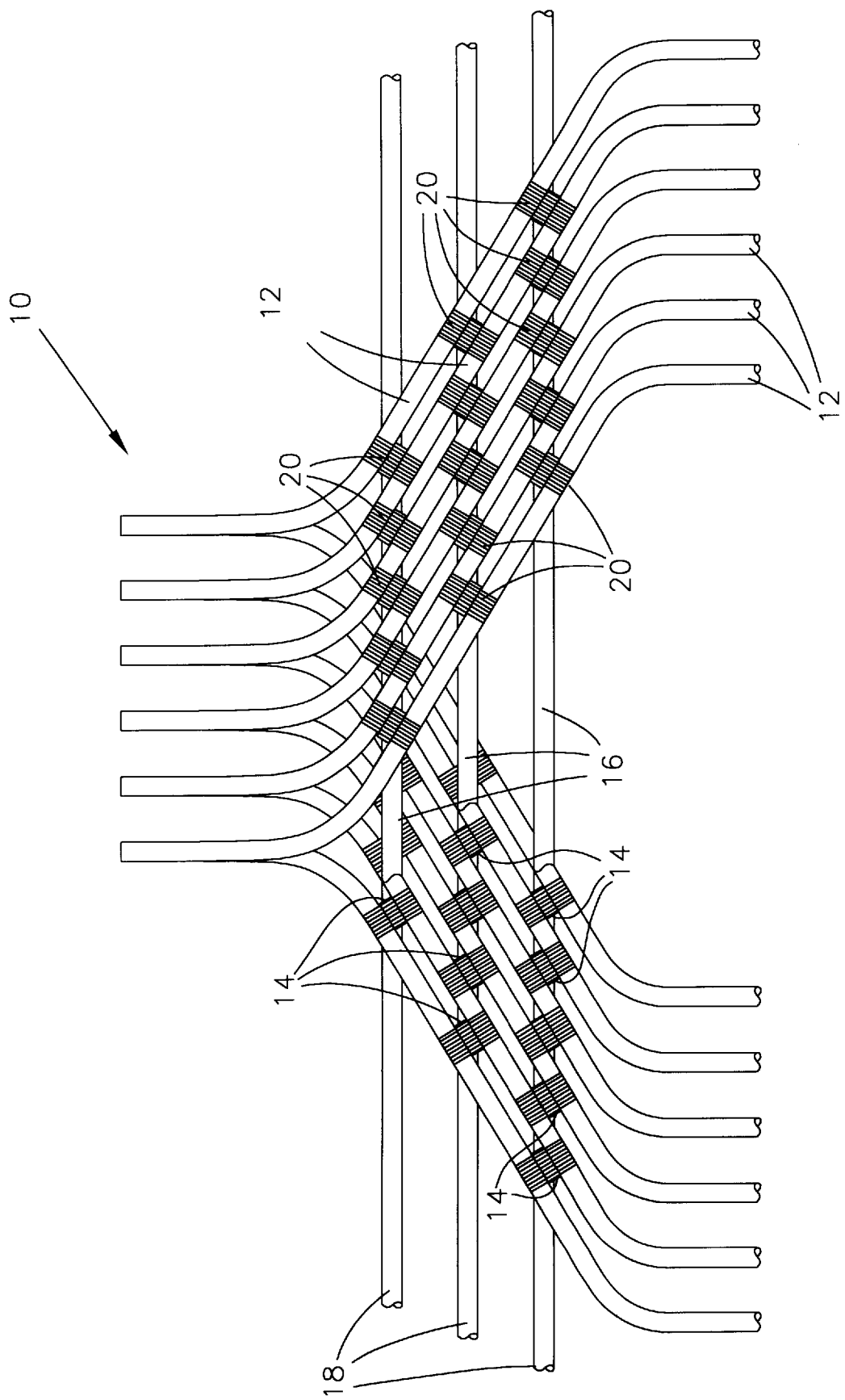

METHOD FOR PREVENTING CORONA SURFACE DAMAGE IN END WINDINGS OF AIR-COOLED MOTORS AND GENERATORS

FIELD OF THE INVENTION

This invention generally relates to high voltage air-cooled motors and generators. More particularly, this invention is directed to a method and materials for preventing surface deterioration by corona activity of end windings and end winding support structures of such motors and generators.

BACKGROUND OF THE INVENTION

Corona is a luminous discharge surrounding high voltage conductors caused by ionization of the surrounding air. Corona occurs when the electrical fields generated by the high voltage conductors are sufficiently high to break down or ionize the air, and is always present to some degree in high voltage air-cooled ac motors and generators. Generally speaking, it is not practical to manufacture large air-cooled high voltage ac motors and generators to operate free of corona activity since doing so would adversely affect the size and efficiency of these machines.

Corona often causes oxidation of organic materials, resulting in discoloration and dusting. In air-cooled machines, the end winding surfaces on the coils and the structures that serve to separate and support the coils, including coil-to-coil space blocks, binding bands, radial rings and bar ties, are formed of organic insulating materials, and are therefore susceptible to deterioration by corona activity. The entire end winding assembly is usually coated with an organic finish paint that is also susceptible to deterioration by corona activity. The paint is usually applied by spraying to cover the end winding assembly and its connection rings and stator core to protect the winding and provide uniform surface coloring for ease of inspection. Paints currently in use on high voltage air-cooled generators and motors include water-reducible phenolic alkyd paints, acrylic waterborne paints, alkyd waterborne paints, acrylic-epoxy waterborne paints, two-component epoxy waterborne paints, and two-component epoxy solvent-borne paints that usually contain a solution of a high molecular weight bisphenol A—diglycidyl ether epoxy resin in a solvent, which is mixed with an amine-type curing agent immediately prior to being sprayed on the end winding assembly. While these coatings have performed well over the years, they are prone to discolor and form powdery deposits that cover the surfaces of stator bars and the support components of end windings.

Various factors affect corona levels and the associated surface discoloration and dusting of polymeric organic materials of end windings. Corona activity between adjacent coils in end windings is affected by coil-to-coil clearances, coil-to-coil voltages, contamination in the cooling gas (e.g., air), and the velocity of the cooling gas through the spaces in the end winding. Furthermore, coil-to-coil blocking and other support components in end windings can affect the surface voltage gradients along a coil, and therefore will also influence corona activity. Corona activity is usually the most severe at locations near coil-to-coil space blocks between phases, and at the connection ring assembly and support structure.

While discoloration and dusting can occur in the end windings of most air-cooled machines after long-term operation, deterioration of this type generally does not affect the service life of the motor or generator. Usually only the paint protecting the end winding is affected. In more severe circumstances, prolonged corona activity can penetrate the paint and begin to attack the ground insulation, but generally will not penetrate through the outermost layer of mica of the multiple layers of mica tape used as ground insulation. However, the effect of the corona activity is easily visible in many machines, and creates maintenance concerns that must be addressed.

SUMMARY OF THE INVENTION

It is an object of this invention to provide an improved coating material for end windings of high voltage air-cooled generators and motors.

It is another object of this invention to provide a method for protecting an end winding with such a coating material that resists deterioration by corona activity.

It is a further object of this invention that such a coating material is in the form of a paint containing a binder, of which at least 20% by weight is silicone.

According to this invention, the end windings of a high voltage air-cooled ac generator or motor are made more resistant to deterioration by corona activity by using a coating, referred to herein as a paint, whose binder contains at least 20% by weight silicone. In particular, the invention entails coating an end winding, including its insulated conductors and separator and support structures, with a paint containing a binder, solvent or thinner, and optional pigments, with at least 20% by weight of the binder being silicone. More preferably, at least 30% by weight of the binder is silicone, with the balance (if any) of the binder being, for example, an alkyd or acrylic resin. According to the invention, deterioration of an end winding is inhibited by applying the paint of this invention to the surfaces of the end winding, including its insulated conductors and separator and support structures. Advantageously, curing or hardening of the paint can be performed without heating.

According to the invention, paints containing at least 20 weight percent silicone exhibit markedly better resistance to corona activity as compared to prior art paints used to protect end windings. The paint of this invention exhibits no deterioration, e.g., discoloration or dusting, under identical test conditions that cause deterioration of prior art paints. The resistance to deterioration appears to be unaffected by the presence of most coloring pigments and other binder materials in the paint. In addition, the paints of this invention have been shown to successfully repair end winding assemblies with prior art paints that have deteriorated from corona activity. With this invention, the end windings in high voltage air-cooled motors and generators are expected to withstand extended service lives without deterioration.

Other objects and advantages of this invention will be better appreciated from the following detailed description.

BRIEF DESCRIPTION OF THE DRAWINGS

The present invention will now be described, by way of example, with reference to the accompanying drawings, in which FIG. 1 represents an end winding of a high voltage air-cooled generator treated by the method and coating materials of this invention.

DETAILED DESCRIPTION OF THE INVENTION

The present invention provides coating materials whose resistance to deterioration from corona activity makes them particularly well suited for use as paints for protecting the end windings and other components of high voltage air-cooled ac motors and generators. FIG. 1 depicts the top and bottom half coils or bars of an end winding 10 for a high voltage air-cooled generator of a type known in the art. As with prior art end windings, the end winding 10 of this invention is composed of a number of stator bars 12 formed by insulating copper conductors with multiple layers of a mica tape, such as those taught in U.S. Pat. No. 3,563,850 to Stackhouse et al and U.S. Pat. No. 5,618,891 to Markovitz. Space blocks 14 are placed between the bars 12 to act as rigid separators to prevent the coils from moving. Radial rings 16 serve a similar function between the top and bottom bars 12. Finally, binding bands 18 constrain the end winding 10 from radial movement, and impregnated glass roving 20 is used to tie the assembly together.

End windings of the type shown in FIG. 1 are coated with a finish paint, usually by spraying, to coat the entire assembly, including the connection rings and stator core (not shown) of the generator. In accordance with prior art practice, the paint is intended to protect the end winding and provide uniform surface coloring for ease of inspection of the winding. The paint of this invention differs from prior art paints by protecting the end winding 10 to the extent that it is not susceptible to deterioration by corona activity. An additional advantage is that the paint cures or hardens without baking, which greatly simplifies processing.

The paint of this invention will generally contain a binder and solvent or thinner, with possible additions of pigment to yield a desired color for the paint after curing. According to the invention, at least 20 weight percent of the binder is silicone, more preferably about 30 to 100 weight percent. The silicones used in this invention belong to the category of siloxanes that consist of silicon and oxygen repeat units, with organic radicals attached to each silicon molecule. The organic radicals most commonly employed in silicone resins are the methyl and phenyl groups, though other alkyl and aryl groups may be used in the invention, as is known in the art where silicones are usually made from mono-, di- and tri-chloro alkyl or aryl silanes.

Any remaining balance of the binder (i.e., 0% to 70% by weight) can be a thermoplastic or thermosetting polymeric material whose properties are compatible for use as a coating on the end winding 10. Notable examples are acrylic and alkyd resins used in paint formulations and that are preferentially co-reacted with the silicone. Phenolic and epoxy resins can also be co-reacted with the silicone. The appropriate solvent or thinner will depend on the particular composition of the binder. If silicone constitutes the entire binder, the silicone can be dissolved in an organic solvent such as xylene, mineral spirits, high solvency petroleum naphtha and solvent blends, or form an emulsion in water.

Suitable pigments include inorganic and organic pigments. Examples of suitable inorganic pigments include carbonates, oxides, sulfides, sulfoselenides, sulfates, silicates, ferrocyanides, chromates, molybdates and synthetic mixed oxide complexes. Specific examples of white inorganic pigments include titanium dioxide, zinc oxide, zinc sulfide, lithopone (white pigment consisting of barium sulfate, zinc sulfide and zinc oxide), and antimony oxide. Specific examples of colored inorganic pigments include iron oxides, chromium oxides, titanium dioxide mixed phase pigments, cadmium pigments, ultramarine and iron blue pigments. Examples of suitable organic pigments and dyes include azo dyes, basic dyes, vat dyes and phthalocyanine pigments such as a copper phthalocyanine pigment commercially available under the name Heliogen Blue K from the BASF-Wyandotte Corporation. While both inorganic and organic pigments may be used with the silicone paints of this invention, the inorganic colored pigments and the inorganic colorless or extender pigments are preferred. "Extenders" are used here to mean a filler that does not contribute color to the paint, such as calcium carbonate.

While silicones have been used in paints (e.g., 20 to 50% by weight) for improved thermal stability and improved water repellency as compared to typical organic systems, and 100% silicone rubber is used for its electrical properties (e.g., encapsulating electrical components), the present invention arises from an unexpected determination that silicones impart corona resistance to paints when present in the paint binder at levels of 30 to 100% by weight, with levels as low as about 20 weight percent also expected to have a beneficial effect. Silicone levels of less than 100 weight percent, e.g., 75% and particularly 30%, are contrary to conventional wisdom regarding the amount of silicone necessary to contribute electrical properties such as corona resistance, especially when present in the form of paint as in the present invention.

During the course of investigations leading to this invention, various paint compositions were formulated and evaluated. Groups 1 and 2 are prior art paints and paints in accordance with this invention, respectively, that were evaluated by being subjected to corona activity for extended periods under accelerated test conditions. In a first evaluation, the test apparatuses used consisted of a 4×8× 0.090 inch (about 100×200×2.3 millimeters) glass panels, each of which was coated with one of the paints being tested. The paints were allowed to dry (cure) at room temperature, after which a conductive silver paint was applied to the opposite surface of the glass panel. The side of the panel coated with the conductive paint was then placed on a grounded metal plate, and a spherical metal electrode placed in the center of the glass panel so as to contact the paint being tested. Ten kilovolts (10 kV) at 60 Hertz was then applied to the electrode, which was sufficiently above the corona inception voltage of the test apparatus to cause corona impingement on the test paint. Two samples of each paint were tested in this manner, with one sample being removed from test after about 18 to 24 hours, the remaining sample being removed after about 120 to 200 hours.

The specific paint compositions tested are summarized below.

| Sample | Pigment | Solvent | Binder (Resin) |
|---|---|---|---|
| GROUP 1 (COMPARISON) | | | |
| 1A | Titanium oxide+ calcium carbonate+ magnesium silicate+ pigment blue 15 | Water-reducible | Phenolic alkyd |
| 1B | Titanium oxide+ calcium carbonate+ magnesium silicate+ yellow iron oxide | Water-reducible | Phenolic alkyd |
| 1C | None | Water-reducible | Phenolic alkyd |
| 1D | Silica | Water-reducible | Phenolic alkyd |
| 1E | None | (1) | Two-part epoxy |
| 1F | Red iron oxide | (1) | Two-part epoxy |
| GROUP 2 (INVENTION) | | | |
| 2A | None | (2) | 100$^w/_o$ Silicone |
| 2B | Silica | (2) | 100$^w/_o$ Silicone |
| 2C | Titanium oxide | (2) | 100$^w/_o$ Silicone |
| 2D | Titanium oxide+ red iron oxide | (2) | 100$^w/_o$ Silicone |
| 2E | Titanium oxide+ | (2) | 100$^w/_o$ Silicone |

-continued

| Sample | Pigment | Solvent | Binder (Resin) |
|---|---|---|---|
| | Heliogen Blue K | | |
| 2F | None | Water-reducible | 100 w/o Silicone |
| 2G | Titanium oxide+ red iron oxide+ calcium carbonate | Water-reducible | 100 w/o Silicone |
| 2H | None | Water-reducible | 30 w/o Silicone: 70 w/o Alkyd |
| 2I | Red iron oxide+ calcium carbonate | Water-reducible | 30 w/o Silicone: 70 w/o Alkyd |
| 2J | Titanium oxide+ red iron oxide+ calcium carbonate | Water-reducible | 30 w/o Silicone: 70 w/o Alkyd |
| 2K | Titanium oxide+ red iron oxide+ calcium carbonate | Water-reducible | 75 w/o Silicone: 25 w/o Acrylic |
| 2L | Titanium oxide+ red iron oxide+ calcium carbonate | Water-reducible | 50 w/o Silicone: 50 w/o Acrylic |

Solvent (1): Xylene + methyl isobutyl ketone + ethylene glycol monoethyl ether
Solvent (2): Xylene + high solvency petroleum naphtha The paints of Group 1 (Samples 1A–1F) performed poorly when exposed to the corona generated at 10 kV and 60 Hz, becoming discolored and forming a powdery residue in a circle beneath and surrounding the electrode after short term exposures of about 4 to about 20 hours. In contrast, the paints of Group 2 did not discolor or form a powdery material on the surface of the paint when subjected to the same exposure. Notably, though the paint binders and pigments were varied in Samples 2A through 2L, all of these paints performed well, which was attributed to the presence of silicone as a binder constituent of the paints.

Additional tests were then performed to simulate corona between coils in the end windings of an air-cooled generator. For this evaluation, pairs of identical insulated stator bars or half coils (ground insulation of mica tape) were separated with space blocks, with the assembly being held together with fiberglass ties. The stator bars, space blocks and ties were all coated with the particular paint being tested. With one bar grounded, a voltage of 20 kV at 60 Hz was applied to the remaining stator bar, causing corona between the bars and around the space blocks and ties.

The paints evaluated for this phase of testing were Sample 1A from Group 1 and Sample 2D of Group 2. After less than forty-eight hours at the stated test conditions, there was significant frosting on the assembly coated with Sample 1A, and discoloration from the original blue color continued to intensify throughout the test, which was aborted after about 7775 hours. Though the paint was severely affected by corona activity, the ground insulation remained well protected. The assembly coated with the Sample 2D paint of this invention did not exhibit frosting or discoloration after over 2000 hours. In contrast to the assembly coated with the prior art paint, neither the paint nor the ground insulation was damaged by corona activity.

At the conclusion of the above test, the assembly coated with the Sample 1A paint was repaired by overcoating with the Sample 2I paint from Group 2. During this process, the paint was observed to wet and film over the damaged paint of the assembly. Once the paint was dried, the assembly was subjected to corona activity for 375 hours at 20 kV and 60 Hz, during which time no discoloration or powdering was observed. To date, this assembly has survived 1582 hours of testing at these conditions without significant discoloration or powdering.

From the above examples, it can be seen that protective paints containing at least 30 weight percent silicone, and surprisingly less than 100 weight percent silicone, have been shown to prevent damage from corona activity under conditions that deteriorate prior art paints in a relatively short time. From the evaluations described above, it was concluded that silicone levels of as low as about 20 weight percent in the binder would be expected to also have a beneficial effect. While the invention has been described in terms of preferred embodiments, it is apparent that other forms could be adopted by one skilled in the art. Accordingly, the scope of our invention is to be limited only by the following claims.

What is claimed is:

1. An end winding of an electrical device chosen from the group consisting of high-voltage air-cooled ac generators and motors, the end winding comprising insulated conductors, means for separating and supporting the conductors, and a protective coating containing a binder, at least 20% by weight of the binder being silicone.

2. An end winding as recited in claim 1, wherein the binder is at least 30% by weight silicone.

3. An end winding as recited in claim 1, wherein the binder is 30% to 75% by weight silicone.

4. An end winding as recited in claim 1, wherein the binder comprises silicone and a second constituent chosen from the group consisting of alkyd, acrylic, phenolic and epoxy resins.

5. An end winding as recited in claim 1, wherein the protective coating further contains pigments.

6. An end winding as recited in claim 5, wherein the pigments are chosen from the group consisting of inorganic pigments and organic pigments.

7. An end winding as recited in claim 5, wherein the pigments are chosen from the group consisting of inorganic colored pigments and inorganic colorless and extender pigments.

8. An end winding as recited in claim 1, wherein the silicone is a siloxane consisting of silicon and oxygen in repeat units and organic radicals attached to the silicon, the organic radicals being chosen from the group consisting of alkyl and aryl groups.

9. An end winding of an electrical device chosen from the group consisting of high-voltage air-cooled ac generators and motors, the end winding comprising insulated conductors, means for separating and supporting the conductors, and a protective coating covering the insulated conductors and the separating and supporting means, the coating containing pigments in a binder that comprises 0% to 70% of a constituent chosen from the group consisting of alkyd, acrylic, phenolic and epoxy resins, and 30% to 100% by weight of a siloxane consisting of silicon and oxygen in repeat units and organic radicals attached to the silicon, the organic radicals being chosen from the group consisting of methyl and phenyl groups.

10. A method of preventing surface deterioration of an end winding comprising insulated conductors and means for separating and supporting the conductors, the method comprising the steps of:
    preparing a coating material containing a binder, at least 20% by weight of the binder being silicone; and
    applying the coating material to the end winding to form a protective coating thereon.

11. A method as recited in claim 10, wherein the binder is at least 30% by weight silicone.

12. A method as recited in claim 10, wherein the binder is 30% to 75% by weight silicone.

13. A method as recited in claim 10, wherein the binder comprises silicone and a second constituent chosen from the group consisting of alkyd, acrylic, phenolic and epoxy resins.

14. A method as recited in claim 10, wherein the coating material further contains pigments.

15. A method as recited in claim 14, wherein the pigments are chosen from the group consisting of inorganic pigments and organic pigments.

16. A method as recited in claim 14, wherein the pigments are chosen from the group consisting of inorganic colored pigments and inorganic colorless and extender pigments.

17. A method as recited in claim 10, wherein the silicone is a siloxane consisting of silicon and oxygen in repeat units and organic radicals attached to the silicon, the organic radicals being chosen from the group consisting of alkyl and aryl groups.

18. A method as recited in claim 10, further comprising the step of assembling the end winding in an electrical device chosen from the group consisting of an air-cooled generators and motors.

19. A method as recited in claim 10, wherein the binder comprises 0% to 70% of a constituent chosen from the group consisting of alkyd and acrylic resins, and 30% to 100% by weight of a siloxane consisting of silicon and oxygen in repeat units and organic radicals attached to the silicon, the organic radicals being chosen from the group consisting of methyl and phenyl groups.

20. A method as recited in claim 10, wherein the coating material further contains a solvent.

* * * * *